United States Patent [19]

Zeeman

[11] Patent Number: 4,783,717
[45] Date of Patent: Nov. 8, 1988

[54] APPARATUS FOR ROTATING A DISK

[75] Inventor: Leendert Zeeman, Dordrecht, Netherlands

[73] Assignee: U.S. Philips Corporation, New York, N.Y.

[21] Appl. No.: 793,025

[22] Filed: Oct. 30, 1985

[30] Foreign Application Priority Data

Jul. 17, 1985 [NL] Netherlands ............... 8502057

[51] Int. Cl.⁴ .................................. G11B 25/04
[52] U.S. Cl. .......................... 369/266; 369/270
[58] Field of Search ............. 369/266, 270, 75.2

[56] References Cited

U.S. PATENT DOCUMENTS 4,499,573 2/1985 Morinaga ................. 369/266

Primary Examiner—Steven L. Stephan
Attorney, Agent, or Firm—F. Brice Faller

[57] ABSTRACT

Apparatus for recording or reading information on a rotating information disc (19) comprises a turntable (11) journalled in a deck plate (1), which comprises a centering member (13), and a clamping device (21) for clamping the information disc onto the turntable. The clamping device comprises a support (5), which is movable between an operating position and a rest position, and a disc pressure member (23) coupled thereto. A flat electric drive unit (31) arranged in the clamping device serves for rotating an information disc placed on the turntable and comprises a stator section (35) which is secured to the support and a rotor section (33) which is secured to the pressure member.

5 Claims, 3 Drawing Sheets

APPARATUS FOR ROTATING A DISK

BACKGROUND OF THE INVENTION

The invention relates to an apparatus for rotating an information disc. The apparatus comprises a deck plate and a turntable journalled in the deck plate for rotation about an axis. The turntable comprises a supporting surface for the information disc, a centring member for centring the information disc on the turntable relative to the axis of rotation, and a clamping device for clamping the information disc onto the turntable, which device comprises a disc-pressure means and a support for the disc-pressure means, which support is movable between an operating position and a rest position. The disc-pressure means is pressed against the information disc on the turntable in the operating position of the support, and is rotatable relative to the support, which support as it moves from the operating position to the rest position, cooperates with the disc-pressure means to move said means away from the information disc and thereby release the information disc. While in its rest position, the support carries the disc-pressure means, and an electric drive unit comprising a stator section and a rotor section for rotating the disc, which is supported by the turntable, in the operating position of the support.

Netherlands patent application No. 8202163 (PHN 10.359, herewith incorporated by reference) describes an optical-disc apparatus in which the turntable is mounted on a spindle of a drive motor, which spindle is rotatable about the axis of rotation. The drive motor, which is supported in the deck plate, is situated underneath the turntable. On the same side of the turntable there is arranged a focusing device comprising an objective by means of which a radiation beam produced by a laser source can be focused on the lower surface of an optical disc placed on the turntable and by means of which the beam reflected by the disc is diverted towards photoelectric information-detection means of the apparatus. In order to enable the entire information surface of the disc to be scanned, which surface extends between a circle of small radius and a circle of larger radius, the objective is mounted so as to be radially movable inside the apparatus. However, this means that in a radial direction the space available for the drive motor is limited and is dictated by the required radial freedom of the objective. Therefore, the drive motor of the known apparatus is required to have a comparatively great axial length in order to be able to produce the motor power and motor torque necessary for driving the turntable, so that the height of the apparatus is comparatively large.

Currently, there is a trend to minimize the height of such apparatus due to current design concepts for audio and video equipment and the need for small portable equipment and equipment suitable for mounting in cars. However, if the height is reduced this also means that the axial length of the drive motor must be reduced. Since the diameter of the drive motor cannot be increased, problems may arise in respect of maintaining the required motor specifications, in particular the power and torque. This may necessitate additional steps such as the use of high grade magnetic materials in the motor, which renders the motor more expensive, or reducing the axial length of the motor only to a limited extent.

SUMMARY OF THE INVENTION

The invention aims at modifying an apparatus of the type defined in the opening paragraph in such a way that its height can be reduced in a cheap and simple but effective manner.

To this end the electric drive unit is mounted in the clamping device, the stator section of the drive unit being secured to the support and the rotor section to the disc pressure means between the stator section and the turntable, and the rotor section is rotatable about the axis of rotation of the turntable in the operating position of the support.

This arrangement of the drive unit enables the diameter of the drive unit to be increased substantially, so that only a small axial dimension of the drive unit is required in order to obtain the desired motor specification. Since, in effect, the drive unit is integrated in the clamping device the additional height occupied by the drive unit is small in comparison with the height occupied by the clamping device. Therefore, the invention has the advantage that by the use of the electric drive unit a surprisingly small height of the apparatus can be obtained.

The the radial dimensions of the drive unit can be increased substantially without influencing the height of the apparatus. Such an increase in radial dimension may be desirable if a drive motor with a higher performance is required. Another advantage is that underneath the turntable more space is available for accommodating other elements of the apparatus.

The stator section and the rotor section are each constructed as a flat annular or disc-shaped section, the two sections being arranged opposite each other so as to form a narrow air gap between them. The clamping device is provided with ferromagnetic means for closing the magnetic flux circuit of the electric drive unit.

In this way a very flat drive unit and consequently an apparatus with a minimal height can be obtained. The stator section can have a coil set and the rotor section comprises an axially magnetized multi-pole permanent magnet, the magnet being arranged on a rotor closing plate of a ferromagnetic material.

Another preferred embodiment is characterized in that on its side which faces the disc-pressure means the support is provided with an actuating member for moving the disc-pressure means and the rotor section of the drive unit during the movement of the support from the operating position to the rest position.

In the operating position of the support the disc-pressure means and the rotor section of the drive unit are not in contact with the actuating member of the support and can thus rotate freely relative to the actuating member. In this respect a very favourable embodiment is characterized in that in the rest position of the support the magnetic means press the disc-pressure means and the rotor section of the electric drive unit against the actuating member of the support.

This step ensures that as the support moves between the operating position and the rest position the rotor section of the drive unit is magnetically urged into a fixed position relative to the stator section of this drive unit, so that no movement of the two sections of the drive unit relative to each other are possible in the rest position of the support. The support can be actuated manually or automatically and may be translatable or pivotable.

DESCRIPTION OF THE PREFERRED EMBODIMENT

Figure 1:
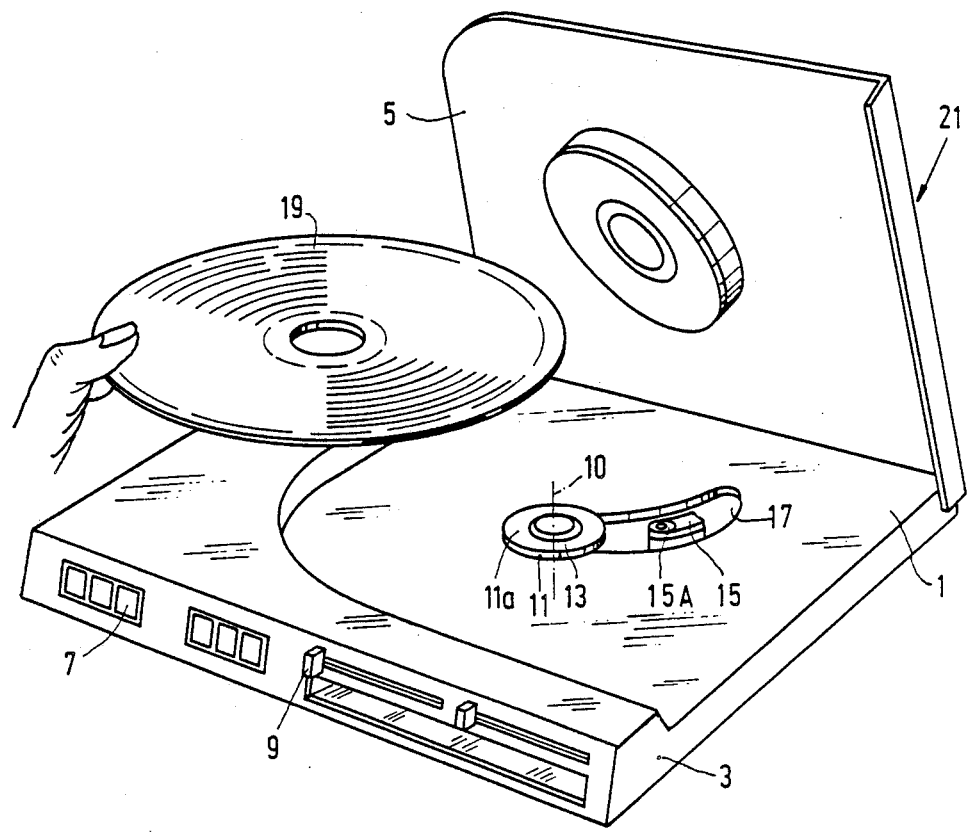
FIG. 1 is a perspective view of an apparatus in accordance with the invention in the form of an audio-disc player having a cover provided with a clamping device.

The disc-record player shown in FIG. 1 comprises a deck plate 1 around which a housing 3 is mounted and a support 5 constituted by a hinged cover. For the actuation of the various functions of the record player a number of keys 7 and slide controls 9 are arranged on the front side of the housing 3. The deck plate 1 carries a turntable 11 which is rotatable about an axis of rotation 10 and which comprises a supporting surface 11a and a centring mandril 13. Further, the deck plate 1 carries a focusing device 15 which is provided with an objective 15a at its upper side. By means of a drive mechanism, not shown, the focusing device 15 is movable with a rotary movement relative to the turntable 11 through a slot 17 formed in the deck plate 1. Apart from the objective 15a the focusing device 15 comprising a laser unit, not shown, which during operations emits a sharply bounded radiation beam which is projected onto an optical disc 19 which is then situated on the surface 11a of the turntable 11. In the present embodiment the disc 19 is an information-carrier for audio signals and has the property that it reflects the radiation beam emitted by the focusing device 15. In the apparatus the reflected beam is received by appropriate opto-electronic means and is converted into signals which are transmitted to further parts of the player. As the construction and operation of the focusing device 15, the electronic means and further parts are irrelevant to the present invention, these elements will not be described in more detail. For this reference is made to European patent application No. 0070070 (PHN 10.095, herewith incorporated by reference), which discloses an opto-electronic device which may be used in an apparatus in accordance with the invention.

The support 5, which is pivotally connected to the housing 3, forms part of a clamping device 21 for clamping the disc 19 onto the turntable 11. The clamping device 21 will be described in more detail with reference to FIGS. 2 and 3 to 5.

Figure 2:
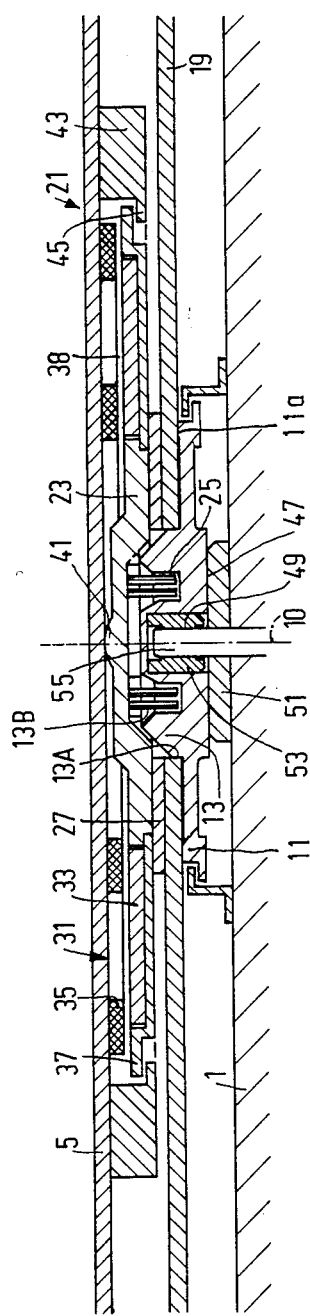
FIG. 2 is a longitudinal sectional view of a part of the clamping device in the first embodiment shown in FIG. 1.

FIG. 2 shows a first example of the clamping device 21, comprising a support 5 and disc-pressure means in the form of plastic pressure member 23. The support 5 is movable between a rest position, as shown in FIG. 1, and an operating position, as shown in FIG. 2. In the operating position of the support 5 the pressure member 23, which is connected to the support 5 in a manner to be described hereinafter, is pressed against the disc 19 on the surface 11a of the turntable 11. An external centring surface 13a of the centring mandril 13 ensures that the disc 19 is and remains positioned correctly relative to the axis of rotation 10. The pressure member 23 can also be positioned relative to the axis of integral rotation by means of centring projections 25 which cooperate with an internal centring surface 13b of the centring mandril 13. At the side facing the disc 19 the member 23 has a rubber ring 27 which contacts the disc 19.

The clamping device 21 includes an electric drive unit 31 comprising a rotor section 33 and a stator section 35. The rotor section 33 comprises a multi-pole axially magnetized annular magnet which is arranged on a rotor closing plate 37 of a ferromagnetic material such as soft iron. The rotor closing plate 37 carrying the magnet is embedded in the pressure member 23. The stator section 35 comprises a plurality of coils which are secured to the support 5 and which are arranged as a ring. Between the rotor section 33 and the stator section 35 a narrow air gap 38 is formed, the annular magnet and the ring of coils being arranged opposite one another. In order to close the magnetic circuit in the drive unit 31 the support 5 should be made of a ferromagnetic material or should be provided with a magnetizable part at the location of the coils.

In the position shown in FIG. 2, which is the operating position of the support 5, the axis of rotation of the rotor section 33 of the drive unit 31 coincides with the axis of rotation 10 of the turntable 11. In this situation the rotor section 33 is connected to the support 5 by means of a thrust bearing 41 and except for this bearing 41 it can rotate freely relative to the support 5. The bearing 41 comprises a rotatable part on the disc-pressure means 23 and a stationary part on the support 5. The pressure required for clamping the disc 19 onto the turntable 11 can be transmitted from the support 5 to the pressure means 23 via the bearing 41. This force is such that an adequate friction is obtained between the rubber ring 27 and the disc 10 to transmit the rotation of the disc-pressure means 23, which is driven by the electric drive unit 31, to the optical disc 19 without slipping.

The support 5 further comprises an annular actuating member 43 which serves for supporting the rotor section 33 of the drive unit 31 and, consequently, the disc-pressure means 23 connected thereto in the rest position and in intermediate positions between the operating position and the rest position of the support 5. For this purpose the actuating member 43 is provided with an inwardly directed flange 45 on which the rotor closing plate 37 can bear.

The turntable 11 is journalled relative to the deck plate 1 by means of an axial spiral-groove bearing 47 and a radial sleeve bearing 49. The spiral-groove bearing 47 is constituted by the lower surface of the turntable 11 and a bearing disc 51 which is secured to the deck plate. The sleeve bearing 49 comprises a bearing sleeve 53 mounted in the turntable 11 and a stationary spindle 55 which is secured to the deck plate.

Figure 3:
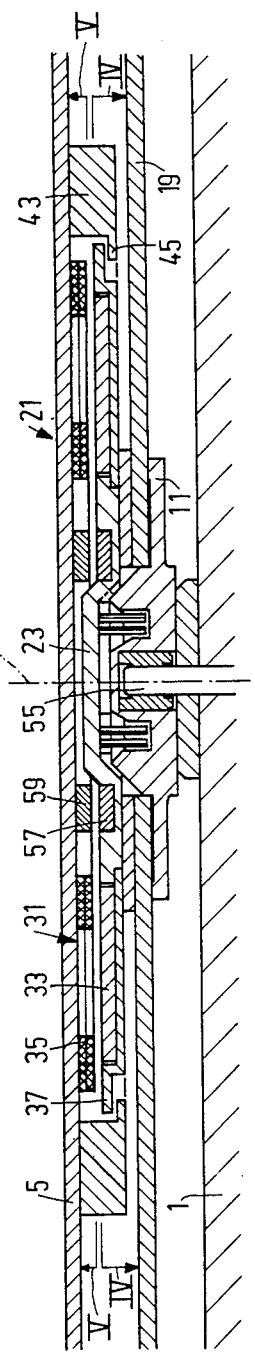
FIG. 3 is a sectional view similar to that of FIG. 2 in a second embodiment of the invention.
Figure 4:
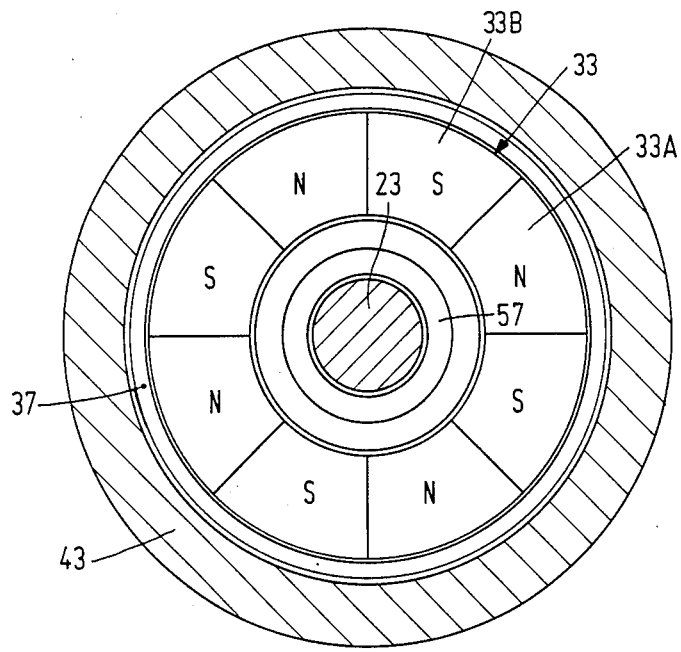
FIG. 4 is a scaled-down sectional view taken on the lines IV—IV in FIG. 3.
Figure 5:
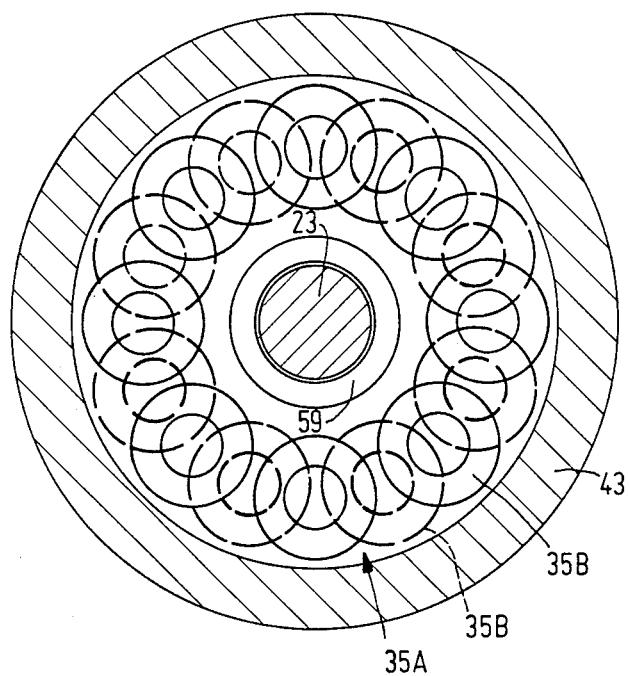
FIG. 5 is a scaled-down sectional view taken on the lines V—V in FIG. 4.

A second embodiment is shown in FIGS. 3 to 5. Again the electric drive unit 31 comprises a rotor section 33 secured to the disc pressure member 23, and a stator section 35, secured to the support 5. The rotor section 33 comprises an annular magnet 33a which is axially magnetized in such a way that the magnet surface 33b facing the stator section 35 exhibits eight magnet poles which are spaced equidistantly along the circumference, adjacent poles always having opposite polarities (see FIG. 4). The stator section 35, which is situated opposite the rotor section 33, comprises a ring of coils 35a which cooperates magnetically with the magnet 33a. The coil ring 35a comprises sixteen coils in total and is formed by two superimposed sets of eight flat coils 35b each (see FIG. 5).

By means of a suitable motor control the motor section 33 with the pressure member 23 connected thereto can be rotated by energizing the drive unit 31, to drive the optical disc 19 in the operating position of the support 5. This embodiment is constructed in such a way that in this operating position the member 23 is freely rotatable relative to the support 5 and, moreover, the member 23 is pressed onto the disc 19 by a magnetic pressure force. For this purpose the clamping device 21 is provided with two facing annular magnets 57 and 59, a magnet 57 being glued to the disc-pressure means 23 and the other magnet 59 being secured to the support 5 in a similar way. The magnets 57 and 59 are axially magnetized with like poles facing. Thus, a repelling magnetic force is obtained between the support 5 and the pressure member 23, which provides the pressure in the operating position and which clamps the rotor closing plate 37 against the flange 45 of the actuating member 43 in the rest position of the support 5, so that the two sections 33 and 35 are maintained in a fixed position relative to one another.

It is alternatively possible to provide the rotor section of the electric drive unit with coils and to provide the stator section with permanent magnets. Moreover, the invention may be employed in disc-record players of other types. For example, the support need not necessarily be the cover of the player.

What is claimed is:

1. Apparatus for rotating a disc comprising:
   a deck plate;
   a turntable journaled in the deck plate for rotation about an axis of rotation;
   centering means for centering the disc on the turntable;
   clamping means for clamping the disc against the turntable, said clamping means comprising pressure means and a support therefor, which support is movable between an operating position and a rest position, which pressure means is pressed against the disc on the turntable in the operating position and is rotatable relative to said support about said axis of rotation, which support in moving from the operating position to the rest position moves said pressure means away from the disc, which support in the rest position carries the pressure means,
   an electric drive unit comprising an annular stator section fixed to said support and an annular rotor section fixed to the pressure means, said sections being coaxial with said axis of rotation which the support is in the operating position, said rotor section lying between the stator section and the turntable.

2. An apparatus as claimed in claim 1, characterized in that the stator section and the rotor section are each constructed as a flat annular or disc-shaped section, the two section being arranged opposite each other so as to form a narrow air gap between them and the clamping means is provided with ferromagnetic means for closing the magnetic flux circuit of the electric drive unit.

3. An apparatus as claimed in claim 2, characterized in that the stator section comprises a coil set and the rotor section comprises an axially magnetized multipole permanent magnet, the magnet being arranged on a rotor closing plate of a ferromagnetic material.

4. An apparatus as claimed in claim 1, 2 or 3, characterized in that on its side which faces the pressure means the support is provided with an actuating member for moving the pressure means and the rotor section of the drive unit during the movement of the support from the operating position to the rest position.

5. An apparatus as claimed in claim 4, the clamping means comprising permanent-magnetic means which exert a magnetic force between the support and the pressure means, characterized in that in the rest position of the support the magnetic means press the pressure means and the rotor section of the electric drive unit against the actuating member of the support.

* * * * *

UNITED STATES PATENT AND TRADEMARK OFFICE
CERTIFICATE OF CORRECTION

PATENT NO. : 4,783,717

DATED : November 8, 1988

INVENTOR(S) : Leendert Zeeman

It is certified that error appears in the above-identified patent and that said Letters Patent is hereby corrected as shown below:

IN THE CLAIMS

Claim 1, Column 6, Line 10    change "which" to --when--

Claim 5, Column 6, Line 36    before "pressure" insert --disc--

Signed and Sealed this

Eighth Day of May, 1990

Attest:

HARRY F. MANBECK, JR.

Attesting Officer

Commissioner of Patents and Trademarks